US012682334B2

(12) United States Patent
Jeon et al.

(10) Patent No.: US 12,682,334 B2
(45) Date of Patent: Jul. 14, 2026

(54) DEVICE AND METHOD FOR DETECTING ON PRODUCT IN AUTOMATIC CHECKOUT SYSTEM, STORAGE MEDIUM STORING INSTRUCTIONS TO PERFORM METHOD FOR DETECTING ON PRODUCT IN AUTOMATIC CHECKOUT SYSTEM

(71) Applicant: Research & Business Foundation SUNGKYUNKWAN UNIVERSITY, Suwon-si (KR)

(72) Inventors: Jae Wook Jeon, Suwon-si (KR); Long Hoang Pham, Suwon-si (KR); Hyungmin Jeon, Suwon-si (KR); Duong Nguyen Ngoc Tran, Suwon-si (KR); Huy-Hung Nguyen, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 112 days.

(21) Appl. No.: 18/913,280

(22) Filed: Oct. 11, 2024

(65) Prior Publication Data

US 2026/0120068 A1      Apr. 30, 2026

(30) Foreign Application Priority Data

Oct. 12, 2023      (KR) ........................ 10-2023-0135771

(51) Int. Cl.
G06Q 20/20          (2012.01)
G06T 7/20            (2017.01)
                    (Continued)

(52) U.S. Cl.
CPC ............. G06Q 20/208 (2013.01); G06T 7/20 (2013.01); G06V 10/242 (2022.01); G06V 10/25 (2022.01); G06V 10/273 (2022.01); G06V 10/30 (2022.01); G06V 10/7747 (2022.01); G06V 20/52 (2022.01); G06V 20/70 (2022.01);
                    (Continued)

(58) Field of Classification Search
CPC .................... G06Q 20/208; G06T 7/20; G06T 2207/20081; G06T 2207/30196; G06T 2207/30242; G06V 10/242; G06V 10/25; G06V 10/273; G06V 10/30; G06V 10/7747; G06V 20/52; G06V 20/70; G06V 40/28
See application file for complete search history.

(56) References Cited

U.S. PATENT DOCUMENTS

| | | | | |
|---|---|---|---|---|
| 11,481,751 | B1 * | 10/2022 | Chaubard | .............. G06V 10/82 |
| 2023/0252443 | A1 * | 8/2023 | McDaniel | ............ G06V 10/255 |
| | | | | 705/23 |

FOREIGN PATENT DOCUMENTS

| | | |
|---|---|---|
| CN | 116311096 | 6/2023 |
| KR | 10-2060567 | 12/2019 |

(Continued)

*Primary Examiner* — Florian M Zeender
*Assistant Examiner* — Kimberly S. Bursum

(57) ABSTRACT

There is provided a method for detecting a product in an automatic checkout system. The method comprises receiving frame images of an automatic checkout counter and preprocessing the received frame images; detecting one or more products in each of the preprocessed frame images using a pre-trained detection model; tracking the one or more products detected in the preprocessed frame images; and counting the one or more detected products based on tracking results for the one or more products.

20 Claims, 4 Drawing Sheets

100

(51) Int. Cl.

| | | |
|---|---|---|
| *G06V 10/24* | (2022.01) | |
| *G06V 10/25* | (2022.01) | |
| *G06V 10/26* | (2022.01) | |
| *G06V 10/30* | (2022.01) | |
| *G06V 10/774* | (2022.01) | |
| *G06V 20/52* | (2022.01) | |
| *G06V 20/70* | (2022.01) | |
| *G06V 40/20* | (2022.01) | |

(52) U.S. Cl.
CPC .... *G06V 40/28* (2022.01); *G06T 2207/20081* (2013.01); *G06T 2207/30196* (2013.01); *G06T 2207/30242* (2013.01)

(56) References Cited

FOREIGN PATENT DOCUMENTS

| | | | |
|---|---|---|---|
| KR | 10-2506971 | 3/2023 | |
| WO | WO-2019032305 A2 * | 2/2019 | ........... G06Q 20/203 |

* cited by examiner

FRAME IMAGE        CORRECTED IMAGE        PREPROCESSED IMAGE

PREDICTED HUMAN HAND REGION

S40

S41

DETERMINE WHETHER AT LEAST ONE OF PRODUCTS ARE INCLUDED IN REGION OF INTEREST IN FRAME IMAGES

S45

CHECK WHETHER AT LEAST ONE OF PRODUCT IS DETECTED DURING PRESET CONSECUTIVE FRAMES WHEN AT LEAST ONE OF PRODUCT IS INCLUDED IN REGION OF INTEREST

ROI d1
c1
c2
d2

BOUNDING BOX

1

DEVICE AND METHOD FOR DETECTING ON PRODUCT IN AUTOMATIC CHECKOUT SYSTEM, STORAGE MEDIUM STORING INSTRUCTIONS TO PERFORM METHOD FOR DETECTING ON PRODUCT IN AUTOMATIC CHECKOUT SYSTEM

CROSS REFERENCE TO RELATED APPLICATION

The present application claims priority to a KR application 10-2023-0135771, filed Oct. 12, 2023, the entire contents of which are incorporated herein for all purposes by this reference.

TECHNICAL FIELD

The present disclosure relates to a product detection method of an automatic checkout system and a product detection device therefor.

This work was supported by Institute for Information & Communications Technology Planning & Evaluation (IITP) grant funded by Korea government (MSIT; Ministry of Science and ICT) (No. 2021-0-01364-003, SW Starlab: Real-time Intelligent Traffic Monitoring System on Edge Devices).

BACKGROUND

Recently, innovations have occurred in the retail industry by applying artificial intelligence (AI) and computer vision (CV) technologies. Among such technologies, automatic checkout (ACO) technology can be regarded as the most essential technology in this field.

In the case of an ideal automatic checkout system, when a customer places selected products on a checkout counter, the system can recognize the products without a problem and return an accurate list of purchased items at once.

Studies are being conducted on such automatic checkout systems to solve problems such as object occlusion, motion blur, similarity between products, and costs that may occur in case of detection or classification errors. In addition, in a case where machine learning such as deep learning is applied to construct an automatic checkout system, it is important to collect training image data that reflects the special characteristics of diverse product types and classifications and frequent updates of product lists.

That is, accuracy, stability, and efficiency are key factors to consider in development of an automatic checkout system.

SUMMARY

An object of the present disclosure is to provide a product detection method of an automatic checkout system which detects products from an image of an automatic checkout counter using a previously trained detection model and counts products on the basis of results of tracking the detected products on the basis of preset conditions, and a product detection device therefor.

In accordance with an aspect of the present disclosure, there is provided a method for detecting a product in an automatic checkout system, the method comprises: receiving frame images of an automatic checkout counter and preprocessing the received frame images; detecting one or more products in each of the preprocessed frame images using a pre-trained detection model; tracking the one or more products detected in the preprocessed frame images; and counting the one or more detected products based on tracking results for the one or more products.

The preprocessing the received frame images may include removing at least one of noise and motion blur from each frame image; and predicting a human hand region in each frame image and removing the predicted human hand region in each frame image by masking.

The removing at least one of noise and motion blur may include removing a residual region excluding an overlapping region in which the predicted human hand region is overlapped with each product.

The detecting one or more products may include detecting a bounding box corresponding to each product in each of the preprocessed frame images.

The tracking the one or more products may include determining whether at least a part of the bounding box is included in a region of interest set in the preprocessed frame images and assigning a product identifier corresponding to the bounding box; and checking whether the bounding box is included in the region of interest during preset consecutive frames among the preprocessed frame images based on the product identifier.

The determining may include determining that the bounding box is included in the region of interest when a center of the bounding box is included in the region of interest and a distance between the center of the bounding box and a center of the region of interest is equal to or less than a predetermined first value.

The determining may include determining that the bounding box is included in the region of interest when the center of the bounding box is included in the region of interest and an intersection over unit (IoU) between the bounding box and the region of interest is equal to or greater than a predetermined second value.

The determining may include determining that the bounding box is included in the region of interest when the center of the bounding box is included in the region of interest and a distance between at least one side of the bounding box and a vertex of the region of interest adjacent to the one side is equal to or greater than a predetermined third value.

The pre-trained detection model may be pre-trained to receive a plurality of training images generated by manipulating at least one of a rotation angle, an enlargement or reduction ratio, or a gamma adjustment value of each of a plurality of sample images, and detect at least one of training products in the plurality of training images.

In accordance with another aspect of the present disclosure, there is provided a device for detecting a product in an automatic checkout system, the device comprises a memory configured to store one or more instructions; and a processor configured to execute the one or more instructions stored in the memory, wherein the instructions, when executed by the processor, cause the processor to: receive frame images of an automatic checkout counter and preprocess the received frame images; detect one or more products in each of the preprocessed frame images using a pre-trained detection model; track the one or more products detected in the preprocessed frame images; and count the one or more detected products based on tracking results for the one or more products.

The processor may be configured to remove at least one of noise and motion blur from each frame image; and predict a human hand region in each frame image and removing the predicted human hand region in each frame image by masking.

The processor may be configured to remove a residual region excluding an overlapping region in which the predicted human hand region is overlapped with each product.

The processor may be configured to detect a bounding box corresponding to each product in each of the preprocessed frame images.

The processor may be configured to determine whether at least a part of the bounding box is included in a region of interest set in the preprocessed frame images and assigning a product identifier corresponding to the bounding box; and check whether the bounding box is included in the region of interest during preset consecutive frames among the preprocessed frame images based on the product identifier.

The processor may be configured to determine that the bounding box is included in the region of interest when a center of the bounding box is included in the region of interest and a distance between the center of the bounding box and a center of the region of interest is equal to or less than a predetermined first value.

The processor may be configured to determine that the bounding box is included in the region of interest when the center of the bounding box is included in the region of interest and an intersection over unit (IoU) between the bounding box and the region of interest is equal to or greater than a predetermined second value.

The processor may be configured to determine that the bounding box is included in the region of interest when the center of the bounding box is included in the region of interest and a distance between at least one side of the bounding box and a vertex of the region of interest adjacent to the one side is equal to or greater than a predetermined third value.

The pre-trained detection model may be pre-trained to receive a plurality of training images generated by manipulating at least one of a rotation angle, an enlargement or reduction ratio, or a gamma adjustment value of each of a plurality of sample images, and detect at least one of training products in the plurality of training images.

The present disclosure can detect products from an image of a checkout counter, track the products during a preset number of frames of the image, and output a result of counting the products according to tracking results.

Accordingly, the present disclosure can accurately detect and count products placed on a checkout counter by not counting products when the products are not located in a preset region of interest the image or when the products are included in the region of interest for a short period of time, thereby improving the efficiency and accuracy of the automatic checkout system.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

Hereinafter, the embodiments of the present invention will be described in detail with reference to the accompanying drawings.

Figure 1:
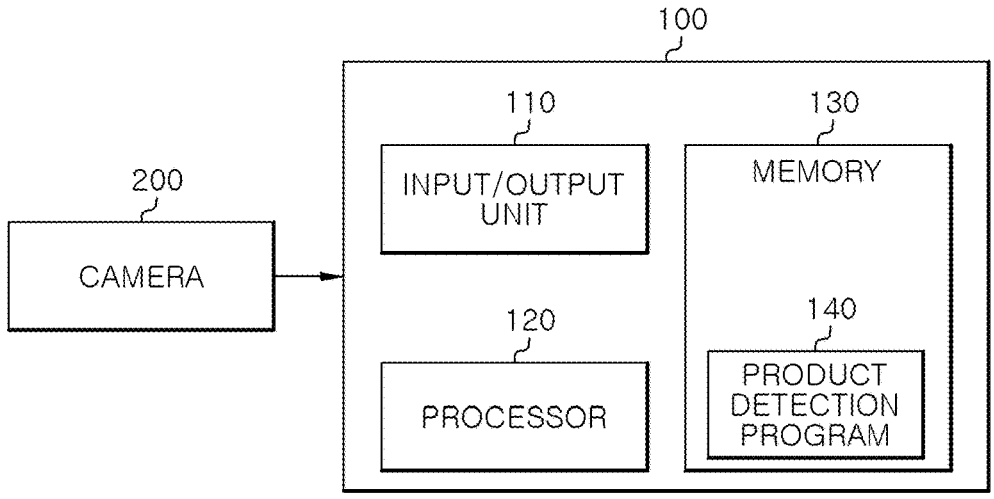
FIG. 1 is a diagram showing a product detection device according to an embodiment of the present disclosure.

FIG. 1 is a diagram showing a product detection device according to an embodiment of the present disclosure.

Referring to FIG. 1, the product detection device 100 of the present embodiment may constitute an automatic checkout counter system along with a camera 200 and the like.

Here, one or more cameras 200 may be placed above a checkout counter (not shown) in the direction of the checkout counter and may capture an image of each of a plurality of products placed on the checkout counter by a user to obtain a plurality of frame images.

Accordingly, the product detection device 100 of the present embodiment may be a device that can accurately detect the plurality of products from the plurality of frame images provided from the camera 200, count the detected products, and output the counting result, for example, the quantity of products. This product detection device 100 may include an input/output unit 110, a processor 120, and a memory 130.

The input/output unit 110 may receive a plurality of frame images from the camera 200. In addition, the input/output unit 110 may output a product counting result generated by the processor 120 to an external device, for example, a payment management device (not shown) of an automatic checkout system.

The processor 120 may receive the plurality of frame images from the input/output unit 110 and detect one or more products from the plurality of frame images using a product detection program 140 stored in the memory 130.

In addition, the processor 120 may track the one or more detected products within the plurality of frame images according to preset conditions, count the corresponding products from tracking results, and output a counting result. The product counting result may be output to the outside through the input/output unit 110.

The memory 130 may store the product detection program 140 and information necessary to execute the product detection program 140. The product detection program 140 may be software including instructions for detecting one or more products from the plurality of frame images provided through the input/output unit 110, tracking the products, and counting the detected products according to tracking results.

Accordingly, when the plurality of frame images of the checkout counter is received through the input/output unit 110, the processor 120 may execute the product detection program 140 in the memory 130 and sequentially perform product detection, product tracking, and product counting in the plurality of frame images to generate a counting result.

Figure 2:
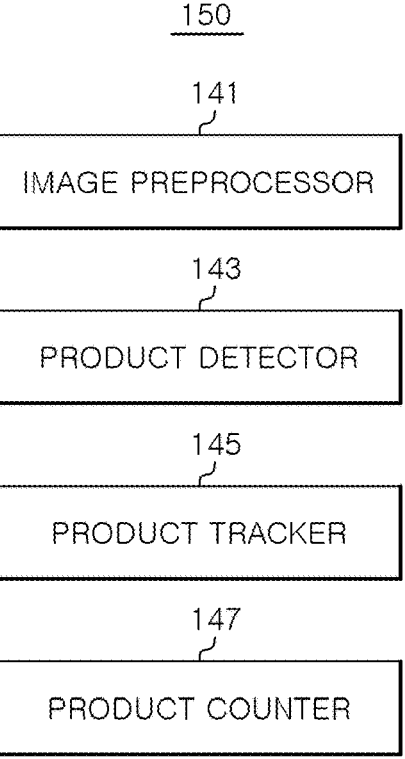
FIG. 2 is a diagram conceptually illustrating the functions of the product detection program of FIG. 1.

FIG. 2 is a diagram conceptually illustrating the functions of the product detection program of FIG. 1.

Referring to FIG. 2, the product detection program 140 of the present embodiment may include an image preprocessor 141, a product detector 143, a product tracker 145, and a product counter 147.

The image preprocessor 141, the product detector 143, the product tracker 145, and the product counter 147 illustrated in FIG. 2 are divided to easily describe the functions of the product detection program 140 of the present embodiment, and the present disclosure is not limited thereto.

For example, the functions of the image preprocessor 141, the product detector 143, the product tracker 145, and the product counter 147 may be merged or separated according to an embodiment of the present disclosure and may be implemented as a series of instructions included in a single program.

The image preprocessor 141 may preprocess a plurality of frame images provided through the input/output unit 110.

For example, the image preprocessor 141 may improve the image quality by removing noise from each of the plurality of frame images or removing motion blur from each frame image.

In addition, the image preprocessor 141 may predict a human hand region, for example, a hand region holding a product, from each of the plurality of frame images from which noise or motion blur has been removed and remove the hand region from each frame image.

For example, the image preprocessor 141 may include a pre-trained prediction model (not shown). This prediction model may receive each of the plurality of frame images, predict a human hand region in each frame image, and detect the hand region.

Therefore, the image preprocessor 141 may mask the human hand region detected through the prediction model using a predetermined mask (not shown). Then, the image preprocessor 141 may remove the masked image from each of the plurality of frame images to prevent the remainder, i.e., the human body, excluding products, from appearing in each frame image.

Here, the image preprocessor 141 may mask the residual region excluding the region where a product and the human hand overlap in each frame image. Accordingly, the preprocessed frame images output from the image preprocessor 141 may include the human hand region overlapping the product. However, according to an embodiment of the present disclosure, the image preprocessor 141 may additionally perform an operation of restoring the overlapping region by referring to an image of a product adjacent thereto.

The product detector 143 may detect one or more products from each of the preprocessed frame images provided through the image preprocessor 141 using a pre-trained detection model.

Here, the detection model may output a bounding box corresponding to one or more products from each of the frame images as a detection result. The bounding box may have a rectangular shape that surrounds the border of a detected product. This detection model may be a neural network model trained using a plurality of training images generated on the basis of a plurality of sample images.

Therefore, the product detector 143 may output information on the one or more products, such as information on the product type and location, along with the bounding box for the one or more products detected using the detection model.

Figure 3:
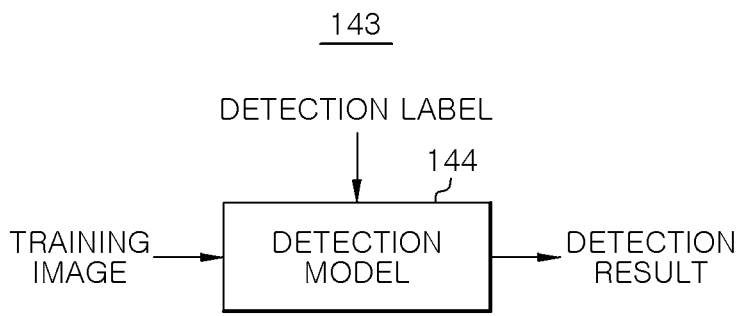
FIG. 3 is a diagram showing a method of training the detection model of the product detector of FIG. 2.

FIG. 3 is a diagram showing a method of training the detection model of the product detector of FIG. 2.

Referring to FIG. 3, the product detector 143 of the present embodiment may include a detection model 144. This detection model 144 may be trained to detect and output a bounding box for one or more products in a plurality of training images when the plurality of training images is provided thereto as input and detection labels are input as label data. This detection model 144 may be a Scaled YOLO v4 model, but is not limited thereto.

Here, the plurality of training images may be generated by manipulating parameters of sample images for each of a plurality of products, which have been collected by being captured in a controlled environment. For example, when a plurality of sample images is collected as a set of individual sample images for each of a plurality of products, the background may be removed from each sample image, and then parameters such as a rotation angle, an enlargement or reduction ratio, and a gamma adjustment value with respect to each product may be manipulated. In addition, a plurality of training images may be generated by randomly setting and arranging locations, occlusion, messiness values, or lighting environment for products whose parameters have been manipulated on the background of a checkout counter.

Accordingly, upon receiving the aforementioned training images and a detection label for a product in each training image, the detection model 144 can detect one or more products in each training image and output a bounding box for each product accordingly.

The product tracker 145 may track one or more products, for example, bounding boxes, detected by the product detector 143 in the plurality of preprocessed frame images.

Here, the product tracker 145 may track the bounding boxes during a plurality of frames of the plurality of preprocessed frame images on the basis of one or more conditions set in advance.

For example, when the product detector 143 detects a bounding box for a product, the product tracker 145 may determine the bounding box as a candidate for a tracking target.

Then, the product tracker 145 may determine whether at least a part of the determined tracking target candidate, that is, the bounding box, is included in a preset region of interest in each of the plurality of frames of the plurality of frame images. Here, the product tracker 145 may determine whether the position of the center point of the bounding box is included in the region of interest.

Here, the product tracker 145 may determine that the bounding box is included in the region of interest when the center point of the bounding box is included in the region of interest and the distance between the center point of the region of interest and the center point of the bounding box is equal to or less than a preset first value.

Here, the first value may be a distance according to the number of pixels in the corresponding frame of the frame image, for example, the number of unit pixels, and may be a distance value corresponding to approximately 50 unit pixels.

In addition, the product tracker 145 may determine that the bounding box is included in the region of interest when the center point of the bounding box is included in the region of interest and the degree of overlap between the bounding box and the region of interest, that is, the intersection over unit (IoU), is equal to or greater than a preset second value.

Here, the second value may be an overlap ratio between the bounding box and the region of interest, and may be approximately 0.9.

In addition, the product tracker 145 may determine that the bounding box is included in the region of interest when the center point of the bounding box is included in the region of interest and the distance between one side of the bounding box and a vertex of the region of interest adjacent thereto is equal to or greater than a preset third value.

Here, the third value may be a distance according to the number of pixels in the corresponding frame of the frame image, for example, the number of unit pixels, and may be a distance value corresponding to approximately 100 unit pixels.

In this manner, the product tracker 145 may determine whether the location of the bounding box for the product detected in each of the plurality of frames of the plurality of frame images is included in the preset region of interest.

In addition, upon determining that the bounding box is included in the region of interest, the product tracker 145 may check whether the bounding box is included in the region of interest during preset consecutive frames among the plurality of frames of each frame image. Here, the consecutive frames may be approximately 3 frames or more.

Upon confirming that the tracking target candidate is included in the region of interest during the consecutive frames of each frame image, the product tracker 145 may assign a product ID to the bounding box. The product tracker 145 may output a tracking result including the product ID.

The product tracker 145 may track the bounding box for the product using the SORT method. The SORT method can use the Kalman filter for motion prediction and use the Hungarian algorithm for track assignment. The Kalman filter may be used to initialize a tracking state for a detection result that has not yet been matched and change the tracking state to a new target, and a matched tracking result may be used to update a tracking state of an existing target.

Here, the state space of each target may be defined by dimensional state variables (u, v, s, r, u', v', and s'). Here, u and v represent the horizontal and vertical 2D pixel coordinates of the target center, and s and r represent the area and aspect ratio of a bounding box. The standard Kalman filter in a uniform motion and linear observation model may designate and target a track segment k, which can be used for counting in the next step. When a new detection result is assigned to existing targets, the bounding box shape of each target may be estimated by predicting the unique position in the current frame. Then, an assignment cost matrix is calculated, which may be determined by the IoU between the actual detected bounding box and all bounding box prediction results for the target. The IoU distance, which is used as a cost evaluation criterion for optimal matching, can be obtained from SORT when it shows fast and efficient performance while being used in parallel with the Kalman filter. In other words, the cost when a certain detection D is matched with a certain track segment T can be calculated through IoU. Here, the optimal solution can be obtained using the Hungarian algorithm.

The product counter 147 may count products corresponding to the product ID on the basis of a tracking result output from the product tracker 145 and output a counting result.

Here, since the product tracker 145 described above checks whether the bounding box is included in the region of interest during consecutive frames and assigns a product ID to each bounding box, the product counter 147 can count the quantity for the corresponding product on the basis of the product ID.

Accordingly, the product detector 100 of the present embodiment does not count products that are not included in the preset region of interest or products that are included in the region of interest for a short period of time according to the tracking result of the product tracker 145, and thus it is possible to perform accurate detection and counting of products placed on the checkout counter, thereby increasing the efficiency and accuracy of the automatic checkout counter system.

Figure 4:
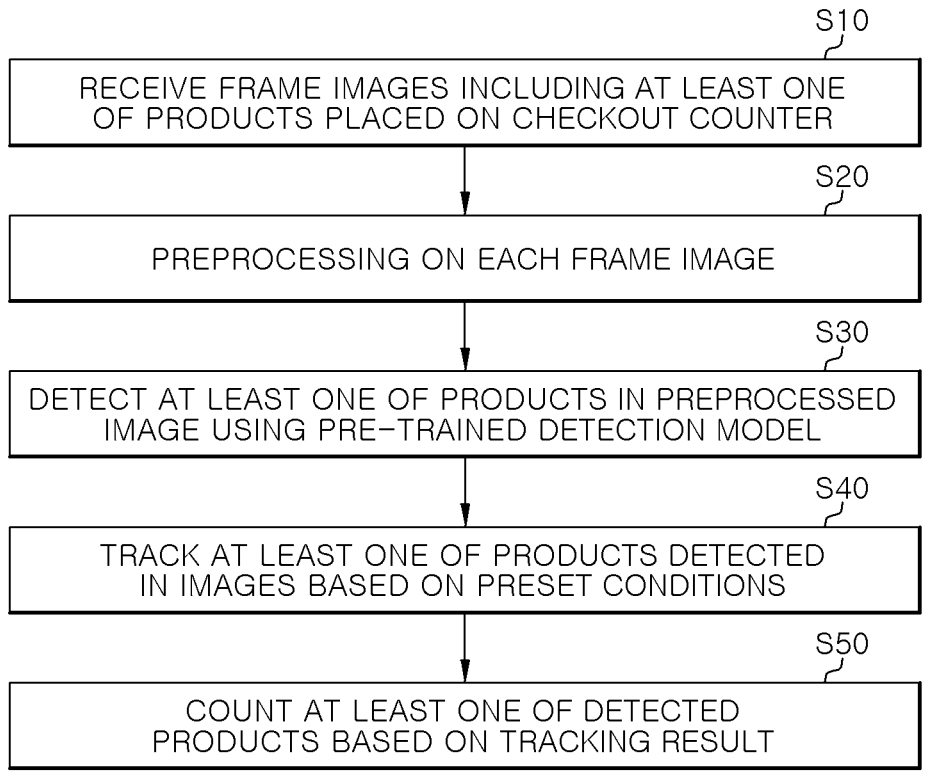
FIG. 4 is a diagram showing a product detection method according to an embodiment of the present disclosure.

FIG. 4 is a diagram showing a product detection method according to an embodiment of the present disclosure.

Referring to FIG. 4, the product detection device 100 of the present embodiment may receive a checkout counter image including a plurality of products placed on a checkout counter, for example, a plurality of frame images, from the camera 200 that is positioned above the checkout counter and captures an image of the checkout counter (S10).

Accordingly, the processor 120 of the product detection device 100 may load the product detection program 140 stored in the memory 130, detect one or more products from each of the plurality of frame images using the product detection program 140, track the detected products, and count the products according to tracking results.

First, the image preprocessor 141 may perform preprocessing of removing at least one of noise and motion blur from each of the plurality of frame images, predicting a human hand region, masking the hand region, and then removing the hand region from each of the plurality of frame images (S20).

Figure 5:
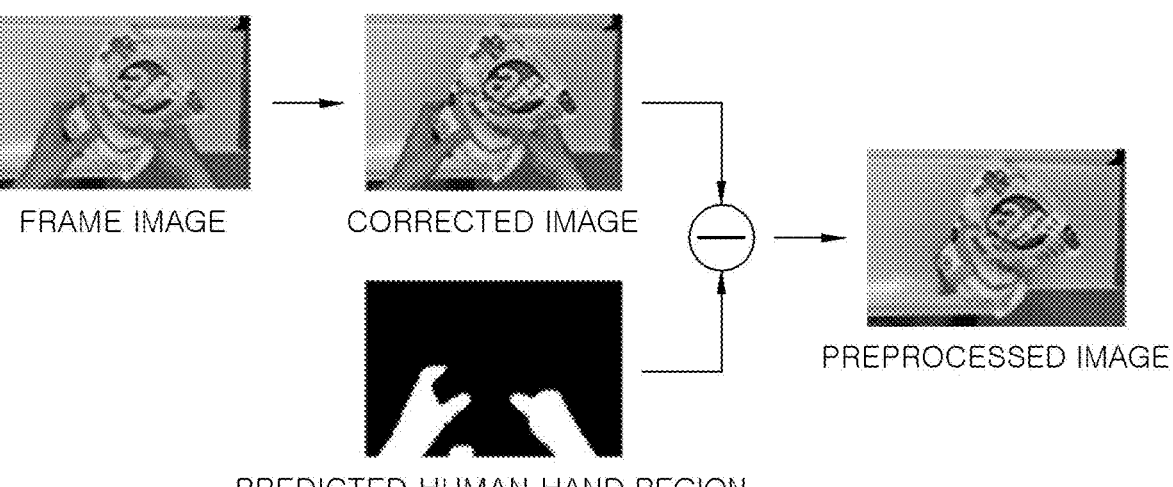
FIG. 5 is a diagram showing an embodiment of a method of preprocessing an image in FIG. 4.

FIG. 5 is a diagram showing an embodiment of a method of preprocessing an image in FIG. 4.

Referring to FIG. 5, the image preprocessor 141 may generate a corrected image with improved image quality by removing at least one of noise and motion blur from each of input images, that is, a plurality of frame images provided through the input/output unit 110.

In addition, the image preprocessor 141 may predict a human hand region in the plurality of frame images or corrected images using a pre-trained prediction model, and perform masking processing on the predicted hand region in the images using a mask.

Here, the image preprocessor 141 may perform masking processing on the residual area excluding a region where a product and the human hand overlap in each frame image.

Accordingly, the image preprocessor 141 can generate and output a preprocessed image corresponding to each of the plurality of frame images by excluding the masked image from the corrected image.

Referring back to FIG. 4, the product detector 143 may detect one or more products from each of the plurality of preprocessed frame images output from the image preprocessor 141 using a pre-trained detection model (S30).

Here, the product detector 143 may detect a bounding box corresponding to a product, and output information on the product along with the bounding box as a detection result.

Next, the product tracker 145 may track the detected product, i.e., the bounding box, output from the product detector 143 during a plurality of frames of the preprocessed frame images (S40).

Here, the product tracker 145 may track the bounding box during the plurality of frames on the basis of the positional relationship between a region of interest set in the frame images and the detected bounding box.

Figures 6, 7:
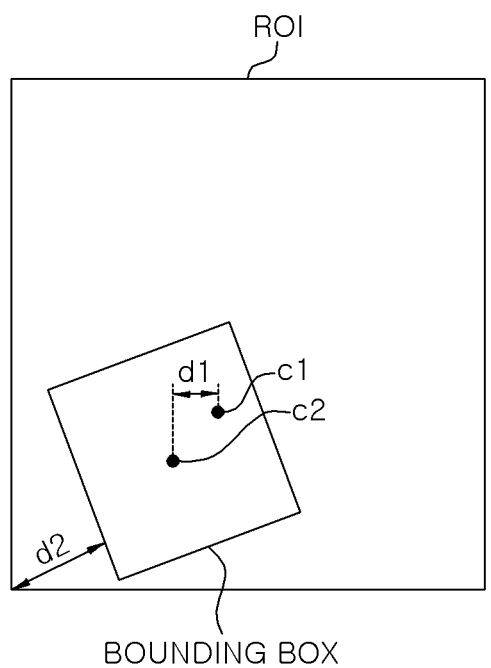
FIG. 6 is a diagram showing a method of tracking a product in FIG. 4.
FIG. 7 is a diagram showing an embodiment of the method of tracking a product in FIG. 6.

FIG. 6 is a diagram showing a method of tracking a product in FIG. 4, and FIG. 7 is a diagram showing an embodiment of the method of tracking a product in FIG. 6.

Referring to FIG. 6 and FIG. 7, first, the product tracker 145 may determine a bounding box for a product detected by the product detector 143 as a tracking target candidate.

Next, the product tracker 145 may determine whether at least a part of the tracking target candidate, that is, the bounding box, is included in a preset region of interest ROI in each of the plurality of frame images (S41).

Here, the product tracker 145 may determine whether the position of the center point c2 of the bounding box is included in the region of interest ROI.

According to one embodiment, the product tracker 145 may determine that the bounding box is included in the region of interest ROI when the center point c2 of the bounding box is included in the region of interest ROI and the distance d1 between the center point c1 of the region of interest ROI and the center point c2 of the bounding box is equal to or less than a preset first value.

Here, the first value may be a distance according to the number of pixels of the corresponding frame, and may be a distance value corresponding to approximately 50 pixels.

According to another embodiment, the product tracker 145 may determine that the bounding box is included in the region of interest ROI when the center point c2 of the bounding box is included in the region of interest ROI and the IoU between the bounding box and the region of interest ROI is equal to or greater than a preset second value.

Here, the second value may be an overlap ratio between the bounding box and the region of interest, and may be approximately 0.9.

According to another embodiment, the product tracker 145 may determine that the bounding box is included in the region of interest ROI when the center point c2 of the bounding box is included in the region of interest ROI and the distance d2 between one side of the bounding box and a vertex of the region of interest ROI adjacent thereto is equal to or greater than a preset third value.

Here, the third value may be a distance according to the number of pixels in the corresponding frame of the frame image, and may be a distance value corresponding to approximately 100 pixels.

In this manner, upon determining that the bounding box is included in the region of interest ROI, the product tracker 145 may check whether the bounding box is included in the region of interest ROI during preset consecutive frames of the plurality of frames of each frame image (S45).

Here, the consecutive frames may be approximately three or more consecutive frames in each frame image.

In addition, upon confirming that the tracking target candidate, that is, the bounding box, is included in the region of interest ROI during the consecutive frames of each frame image, the product tracker 145 may assign a product ID to the corresponding bounding box and output a tracking result including the product ID.

Referring back to FIG. 4, the product counter 147 may count products corresponding to the product ID on the basis of tracking results output from the product tracker 145 and output the counting result (S50).

Accordingly, the processor 120 may output the counting result output from the product counter 147 to a payment management device of the automatic checkout system through the input/output unit 110.

As described above, the product detection method according to the present embodiment can track one or more products detected from an image of a checkout counter for a preset number of frames and output counting results for the detected products on the basis of tracking results.

Accordingly, the present disclosure does not count products when the products are not located in a region of interest set in an image or when the products are included in the region of interest for a short period of time, and thus it is possible to perform accurate detection and counting of products placed on a checkout counter, thereby increasing the efficiency and accuracy of the automatic checkout counter system.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for detecting a product in an automatic checkout system, the method comprising:
   receiving frame images of an automatic checkout counter and preprocessing the received frame images;

detecting one or more products in each of the preprocessed frame images using a pre-trained detection model, wherein the detecting one or more products includes detecting a bounding box corresponding to each product in each of the preprocessed frame images;

tracking the one or more products detected in the preprocessed frame images, wherein the tracking the one or more products includes:

determining whether at least a part of the bounding box is included in a region of interest set in the preprocessed frame images and assigning a product identifier corresponding to the bounding box wherein the determining includes determining that the bounding box is included in the region of interest when a center of the bounding box is included in the region of interest and a distance between the center of the bounding box and a center of the region of interest is equal to or less than a predetermined first value; and checking whether the bounding box is included in the region of interest during preset consecutive frames among the preprocessed frame images based on the product identifier; and counting the one or more detected products based on tracking results for the one or more products.

2. The method of claim 1, wherein the preprocessing the received frame images includes:

removing at least one of noise and motion blur from each frame image; and predicting a human hand region in each frame image and removing the predicted human hand region in each frame image by masking.

3. The method of claim 2, wherein the removing at least one of noise and motion blur includes removing a residual region excluding an overlapping region in which the predicted human hand region is overlapped with each product.

4. The method of claim 1, wherein the pre-trained detection model is pre-trained to receive a plurality of training images generated by manipulating at least one of a rotation angle, an enlargement or reduction ratio, or a gamma adjustment value of each of a plurality of sample images, and detect at least one of training products in the plurality of training images.

5. A device for detecting a product in an automatic checkout system, the device comprising:

a memory configured to store one or more instructions; and a processor configured to execute the one or more instructions stored in the memory, wherein the instructions, when executed by the processor, cause the processor to:

receive frame images of an automatic checkout counter and preprocess the received frame images;

detect one or more products in each of the preprocessed frame images using a pre-trained detection model, wherein detecting one or more products includes detecting a bounding box corresponding to each product in each of the preprocessed frame images;

track the one or more products detected in the preprocessed frame images, wherein to track the one or more products includes:

determine whether at least a part of the bounding box is included in a region of interest set in the preprocessed frame images and assigning a product identifier corresponding to the bounding box wherein the determining includes determining that the bounding box is included in the region of interest when a center of the bounding box is included in the region of interest and a distance between the center of the bounding box and a center of the region of interest is equal to or less than a predetermined first value; and check whether the bounding box is included in the region of interest during preset consecutive frames among the preprocessed frame images based on the product identifier; and count the one or more detected products based on tracking results for the one or more products.

6. The device of claim 5, wherein the processor is configured to:

remove at least one of noise and motion blur from each frame image; and predict a human hand region in each frame image and removing the predicted human hand region in each frame image by masking.

7. The device of claim 6, wherein the processor is configured to remove a residual region excluding an overlapping region in which the predicted human hand region is overlapped with each product.

8. The device of claim 5, wherein the pre-trained detection model is pre-trained to receive a plurality of training images generated by manipulating at least one of a rotation angle, an enlargement or reduction ratio, or a gamma adjustment value of each of a plurality of sample images, and detect at least one of training products in the plurality of training images.

9. A non-transitory computer readable storage medium storing computer executable instructions, wherein the instructions, when executed by a processor, cause the processor to perform a method for detecting a product in an automatic checkout system, the method comprising:

receiving frame images of an automatic checkout counter and preprocessing the received frame images;

detecting one or more products in each of the preprocessed frame images using a pre-trained detection model, wherein detecting one or more products includes detecting a bounding box corresponding to each product in each of the preprocessed frame images;

tracking the one or more products detected in the preprocessed frame images, wherein the tracking the one or more products includes:

determining whether at least a part of the bounding box is included in a region of interest set in the preprocessed frame images and assigning a product identifier corresponding to the bounding box wherein the determining includes determining that the bounding box is included in the region of interest when a center of the bounding box is included in the region of interest and a distance between the center of the bounding box and a center of the region of interest is equal to or less than a predetermined first value; and checking whether the bounding box is included in the region of interest during preset consecutive frames among the preprocessed frame images based on the product identifier; and counting the one or more detected products based on tracking results for the one or more products.

10. The method of claim 9, wherein the preprocessing the received frame images includes:

removing at least one of noise and motion blur from each frame image; and predicting a human hand region in each frame image and removing the predicted human hand region in each frame image by masking.

11. The method of claim 10, wherein the removing at least one of noise and motion blur includes removing a residual region excluding an overlapping region in which the predicted human hand region is overlapped with each product.

12. The method of claim 9, wherein the pre-trained detection model is pre-trained to receive a plurality of training images generated by manipulating at least one of a rotation angle, an enlargement or reduction ratio, or a gamma adjustment value of each of a plurality of sample images, and detect at least one of training products in the plurality of training images.

13. A method for detecting a product in an automatic checkout system, the method comprising:

receiving frame images of an automatic checkout counter and preprocessing the received frame images;

detecting one or more products in each of the preprocessed frame images using a pre-trained detection model, wherein the detecting one or more products includes detecting a bounding box corresponding to each product in each of the preprocessed frame images;

tracking the one or more products detected in the preprocessed frame images, wherein the tracking the one or more products includes:

determining whether at least a part of the bounding box is included in a region of interest set in the preprocessed frame images and assigning a product identifier corresponding to the bounding box wherein the determining includes determining that the bounding box is included in the region of interest when the center of the bounding box is included in the region of interest and an intersection over unit (IoU) between the bounding box and the region of interest is equal to or greater than a predetermined second value; and checking whether the bounding box is included in the region of interest during preset consecutive frames among the preprocessed frame images based on the product identifier; and counting the one or more detected products based on tracking results for the one or more products.

14. The method of claim 13, wherein the preprocessing the received frame images includes:

removing at least one of noise and motion blur from each frame image; and predicting a human hand region in each frame image and removing the predicted human hand region in each frame image by masking.

15. The method of claim 14, wherein the removing at least one of noise and motion blur includes removing a residual region excluding an overlapping region in which the predicted human hand region is overlapped with each product.

16. The method of claim 13, wherein the pre-trained detection model is pre-trained to receive a plurality of training images generated by manipulating at least one of a rotation angle, an enlargement or reduction ratio, or a gamma adjustment value of each of a plurality of sample images, and detect at least one of training products in the plurality of training images.

17. A method for detecting a product in an automatic checkout system, the method comprising:

receiving frame images of an automatic checkout counter and preprocessing the received frame images;

detecting one or more products in each of the preprocessed frame images using a pre-trained detection model, wherein the detecting one or more products includes detecting a bounding box corresponding to each product in each of the preprocessed frame images;

tracking the one or more products detected in the preprocessed frame images, wherein the tracking the one or more products includes:

determining whether at least a part of the bounding box is included in a region of interest set in the preprocessed frame images and assigning a product identifier corresponding to the bounding box wherein the determining includes determining that the bounding box is included in the region of interest when the center of the bounding box is included in the region of interest and a distance between at least one side of the bounding box and a vertex of the region of interest adjacent to the one side is equal to or greater than a predetermined third value; and checking whether the bounding box is included in the region of interest during preset consecutive frames among the preprocessed frame images based on the product identifier; and counting the one or more detected products based on tracking results for the one or more products.

18. The method of claim 17, wherein the preprocessing the received frame images includes:

removing at least one of noise and motion blur from each frame image; and predicting a human hand region in each frame image and removing the predicted human hand region in each frame image by masking.

19. The method of claim 18, wherein the removing at least one of noise and motion blur includes removing a residual region excluding an overlapping region in which the predicted human hand region is overlapped with each product.

20. The method of claim 17, wherein the pre-trained detection model is pre-trained to receive a plurality of training images generated by manipulating at least one of a rotation angle, an enlargement or reduction ratio, or a gamma adjustment value of each of a plurality of sample images, and detect at least one of training products in the plurality of training images.

* * * * *